(12) United States Patent
Meernik (10) Patent No.: US 7,344,005 B2
(45) Date of Patent: Mar. 18, 2008

(54) SELF LOCKING APPARATUS

(75) Inventor: Paul R. Meernik, Redford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/715,803

(22) Filed: Nov. 18, 2003

(65) Prior Publication Data

US 2005/0103579 A1 May 19, 2005

(51) Int. Cl.
*B65H 59/10* (2006.01)

(52) U.S. Cl. .................. 188/67; 188/300; 267/134

(58) Field of Classification Search ........... 267/134, 267/135, 116, 120, 139, 161, 162; 188/67, 188/300, 265; 403/372; 248/354.1
See application file for complete search history.

(56) References Cited

U.S. PATENT DOCUMENTS

| | | | | |
|---|---|---|---|---|
| 3,039,757 A * | 6/1962 | Barr | ............... | 267/140 |
| 3,758,092 A | 9/1973 | McGregor | ............... | 267/131 |
| 3,759,351 A * | 9/1973 | Purple | ............... | 188/377 |
| 3,788,626 A * | 1/1974 | Isaacson | ............... | 267/202 |
| 4,097,080 A | 6/1978 | Petry | ............... | 293/85 |
| 4,624,493 A * | 11/1986 | Hillebrand et al. | ......... | 293/136 |
| 4,691,889 A * | 9/1987 | Richards | ............... | 248/343 |
| 4,830,417 A | 5/1989 | Bates et al. | ............... | 293/134 |
| 4,893,857 A * | 1/1990 | Bobinger et al. | ........... | 293/136 |
| 4,934,749 A | 6/1990 | Folarin | ............... | 293/134 |
| 4,988,081 A | 1/1991 | Dohrmann | ............... | 267/64.15 |
| 5,370,429 A | 12/1994 | Reuber et al. | ............... | 293/119 |
| 5,593,195 A | 1/1997 | Lei | ............... | 293/134 |
| 5,884,959 A * | 3/1999 | Hillen | ............... | 293/134 |
| 5,967,573 A | 10/1999 | Wang | ............... | 293/119 |
| 6,174,008 B1 | 1/2001 | Kramer et al. | ............... | 293/118 |
| 6,302,458 B1 | 10/2001 | Wang et al. | ............... | 293/132 |
| 6,401,565 B1 | 6/2002 | Wang et al. | ............... | 74/502.4 |
| 6,536,818 B1 | 3/2003 | Moss | ............... | 293/134 |
| 2002/0050723 A1 | 5/2002 | Wang et al. | ............... | 293/132 |
| 2003/0000793 A1* | 1/2003 | Brock et al. | ............... | 192/70.28 |

* cited by examiner

*Primary Examiner*—Bradley King (57) ABSTRACT

A self locking apparatus is disclosed having a housing, a load initiating element located within the housing, a spring located adjacent to the load initiating element and configured to expand in compression against the housing in response to a compressive load, and a compression member slideably disposed within the housing and configured to compress the spring from a side opposite the load initiating element. The load initiating element, spring and compression member are slideable within the housing in a first axial direction and in a second opposite axial direction in response to an axial load on the load initiating element, and lockable within the housing in the second axial direction in response to an axial load on the compression member in the second axial direction.

16 Claims, 6 Drawing Sheets

SELF LOCKING APPARATUS

TECHNICAL FIELD

The presently disclosed apparatus relates to a self locking apparatus.

BACKGROUND OF THE INVENTION

Self locking apparatuses that can be positioned through a continuum of locations may be utilized in many applications. Some of these applications may fall into what might be described as temporary structures with telescoping elements. Among these are jack stands, extendable tripods, and canopies with telescoping legs.

If, in addition, such a self locking apparatus will stroke and absorb energy in a controlled fashion, if the loading on the self locking apparatus exceeds a design threshold, then such self locking apparatuses may find use in a number of automotive applications. These automotive applications include, but are not limited to: (1) an extendable/retractable bumper used to increase an automobile's energy absorbing space; (2) an extendable/retractable knee bolster used to help restrain vehicle occupants and absorb their kinetic energy during a rapid deceleration; and (3) a seatbelt pretensioner/load-limiter where a stroking distance is used to limit load and absorb energy. Accordingly, manufacturers continue to seek improved self locking apparatuses for a variety of reasons.

SUMMARY OF THE INVENTION

The disclosed apparatus relates to a self locking apparatus comprising: a housing; a load initiating element located within the housing; a spring located adjacent to the load initiating element, and configured to expand in compression against the housing; and wherein the load initiating element and spring are slideable within the housing until the spring is loaded into a self locking mode.

The disclosed apparatus also relates to a self locking apparatus comprising: an outer tube; an inner tube located within the outer tube; a load initiating element located within the outer tube and around a portion of the inner tube; a spring located adjacent to the load initiating element and around a portion of the inner tube and configured to expand in compression against the inner tube; and the load initiating element, spring and outer tube are slideable about the inner tube until the spring is loaded into a self locking mode.

In addition, the disclosed apparatus relates to a self locking apparatus comprising: an outer tube; a cylindrical body, with a plurality of slotted surfaces forming a plurality of load transfer segments, and with a bottom annulus, the cylindrical body located within the outer tube; a spring located adjacent to the bottom annulus and configured to expand in compression against the load transfer segments; and the slotted cylindrical body and spring are slideable within the outer tube in the absence of the spring being loaded into a self locking mode.

Additionally, the disclosed apparatus relates to a self locking apparatus comprising: an inner tube; a cylindrical body, with a plurality of slotted surfaces forming a plurality of load transfer segments, and with a bottom annulus, the cylindrical body located adjacent to an inner tube; a spring located adjacent to the bottom annulus and configured to expand in compression against the load transfer segments; and the inner tube is slideable with respect to the slotted cylindrical body and spring in the absence of the spring being loaded into a self locking mode.

BRIEF DESCRIPTION OF THE DRAWINGS

Referring now to the figures, which are exemplary embodiments, and wherein like elements are numbered alike.

DESCRIPTION OF THE PREFERRED EMBODIMENT

Figure 1:
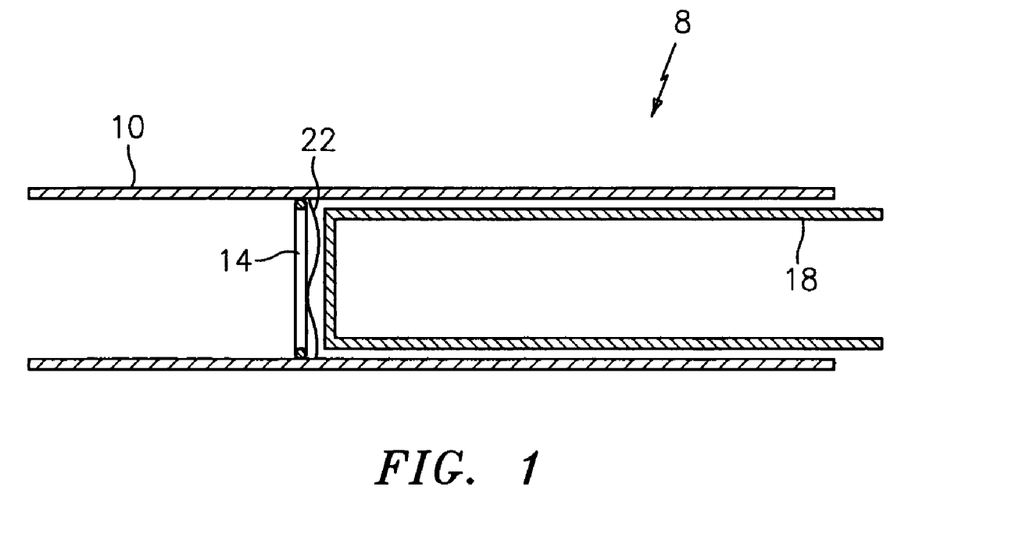
FIG. 1 is a top sectional view of one embodiment of a self locking apparatus.
Figure 2:
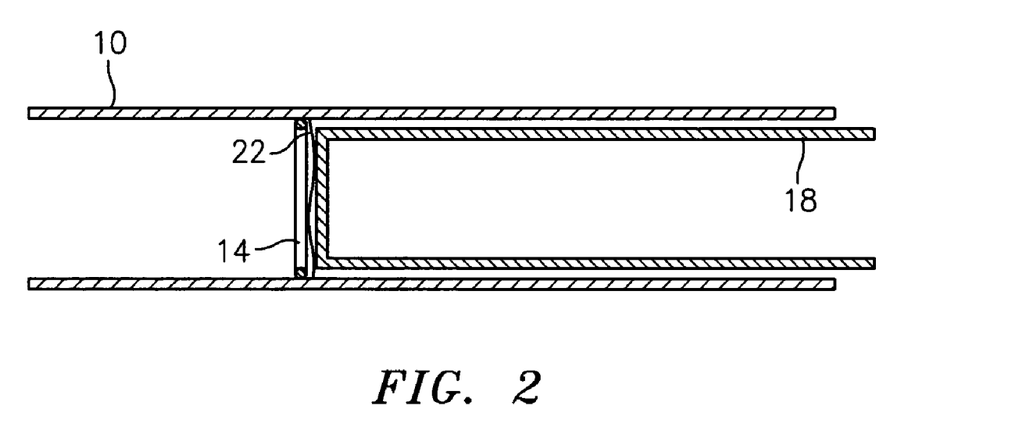
FIG. 2 is top sectional view of the self locking apparatus from FIG. 1 with the inner tube axially moved towards the left.

Referring to FIG. 1, a top sectional view of one embodiment 8 of a self locking apparatus is shown. A housing 10 is shown with a load initiating element 14 located within the housing 10. The housing may be a tube. The load initiating element 14 may be a friction element. A friction element may include o-rings, piston rings, or any devices that will provide an axial frictional force acting between the load initiating element 14 and the inner surface of the housing 10. An inner tube 18 is shown located within the housing 10. Positioned between the inner tube 18 and the load initiating element 14 is a wave spring 22. Although a wave spring is shown here, any spring that expands upon compression may be used, including, but not limited to a conic spring. FIG. 2 is a top sectional view of the embodiment 8 of the self locking apparatus from FIG. 1 with the inner tube 18 axially moved towards the left. As the inner tube moves to the left, the wave spring 22 is compressed between the load initiating element 14 and the inner tube 18. A wave spring when compressed will expand radially outward. Thus, if one or more wave springs are installed in a tube 10 with minimal radial clearance and compressed, expansion will occur and radial loading will result between the outer circumference of the wave spring 22 and the inner surface of the enclosing housing 10. With proper selection of wave spring and tubing stiffness, the friction resulting from the interference between the wave spring 22 and the housing 10 wall can be significantly greater than the axial loading necessary to initially compress the wave spring 22. When the friction resulting from the interference between the wave spring 22 and the housing 10 is significantly greater than the axial loading, then the self locking apparatus is in a self locking mode.

In one non-limiting embodiment of the self locking apparatus shown in FIGS. 1 and 2, the wave spring 22 may have three waves, an inner diameter of about 9.0 mm, an outer diameter of about 12.5 mm, a height of about 0.9 mm, a thickness of about 0.18 mm, and a nominal deflection of about 0.3 mm at a load of about 24 Newtons. The housing 10 may be a tube with an inner diameter of about 12.58 mm, a radial tube thickness of about 2.0 mm, and a friction of coefficient of about 0.57 for steel on steel. With the above specified wave spring installed in the above specified tube, if the spring is compressed with a load of about 40 Newtons, the resulting radial load between the spring and tube would be about 280 Newtons, with a frictional load of about 160 Newtons. With the resisting load being greater than the applied load, the spring would not move within the tube, thus it would be in a self locking mode. With the use of a stack of six such wave springs, a load resistance of approximately 1000 Newtons would be obtained. Alternate dimensions and loadings may be employed for alternative designs.

Figure 3:
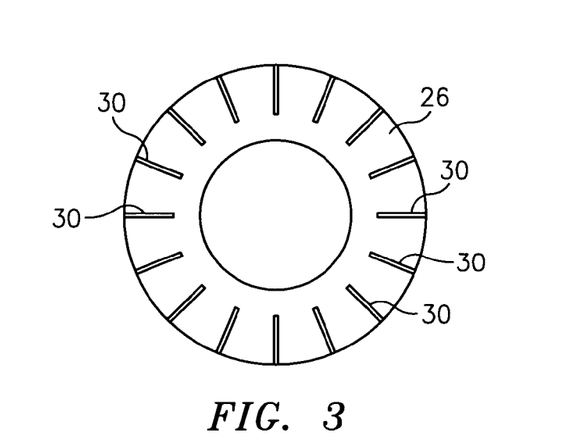
FIG. 3 is a top view of an outwardly biased conic spring.
Figure 4:
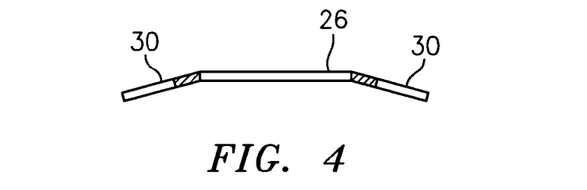
FIG. 4 is a cross-sectional side view of the conic spring from FIG. 3.
Figure 5:
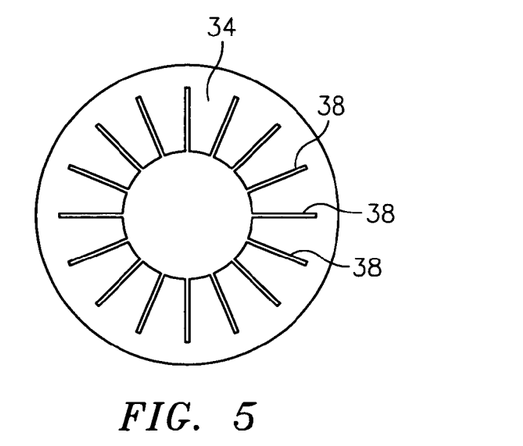
FIG. 5 is a top view of an inwardly biased conic spring.
Figure 6:
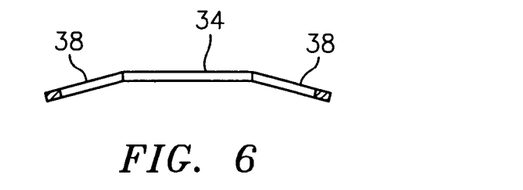
FIG. 6 is a cross-sectional side view of the conic spring from FIG. 5.
Figure 7:
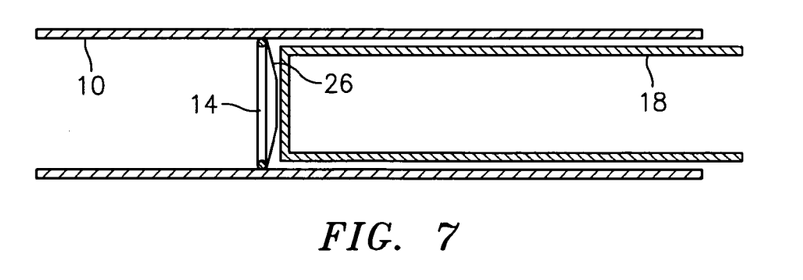
FIG. 7 is a top sectional view of one embodiment of a self locking apparatus with a conic spring.
Figure 8:
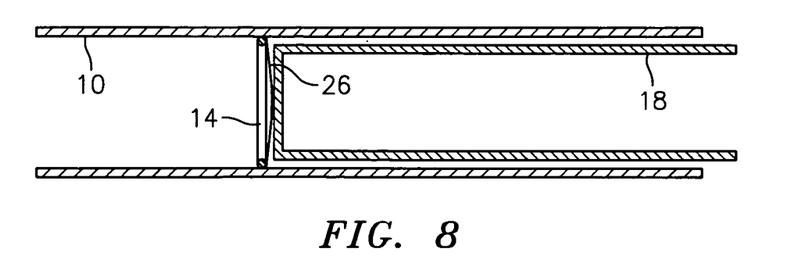
FIG. 8 is top sectional view of another embodiment of the self locking apparatus with a conic spring from FIG. 7 with the inner tube axially moved towards the left.

The disclosed self locking apparatus is not limited to a wave spring for providing the radial expansion. A conic spring, also known as a Belleville washer, when axially compressed will expand both radially outward and inward. FIG. 3 shows a top view of a conic spring 26 with a plurality of slots 30 located near the outer edge of the conic spring 26. FIG. 4 shows a cross-sectional side view of the conic spring 26. By introducing slots 30 near the outer edge of the conic spring 26, one can bias the expansion in a radially outward direction. FIG. 5 shows a conic spring 34 with a plurality of slots 38 located near the inner edge of the conic spring 34. By introducing slots 38 near the inner edge, one can bias the expansion in a radially inward direction. FIG. 6 shows a cross-sectional side view of the conic spring 34. FIGS. 7 and 8 show how a conic spring can be arranged in a similar arrangement as the wave spring shown in FIGS. 1 and 2. In FIG. 8, the conic spring 26 expands in compression and creates a frictional force between the conic spring 26 and the inner surface of the housing 10, which locks the inner tube 18, conic spring 26 and load initiating element 14 in place relative to the housing 10.

Figure 9:
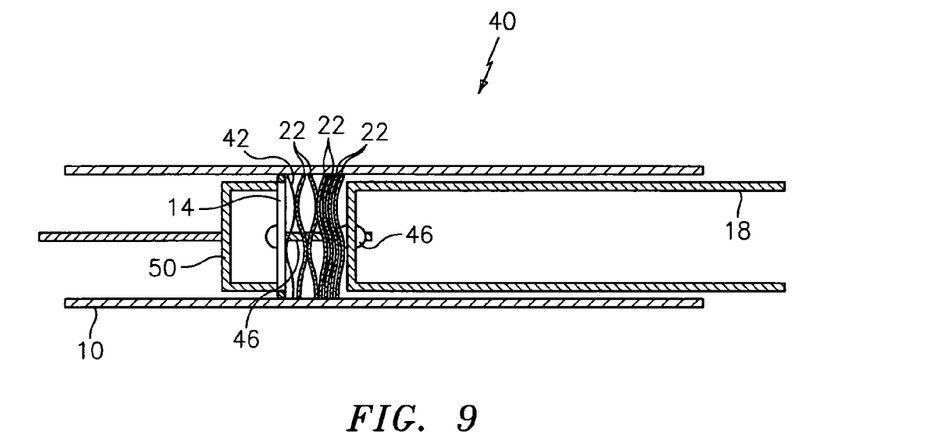
FIG. 9 is a top sectional view of self locking apparatus with an initiator wave spring and multiple additional wave springs.
Figure 10:
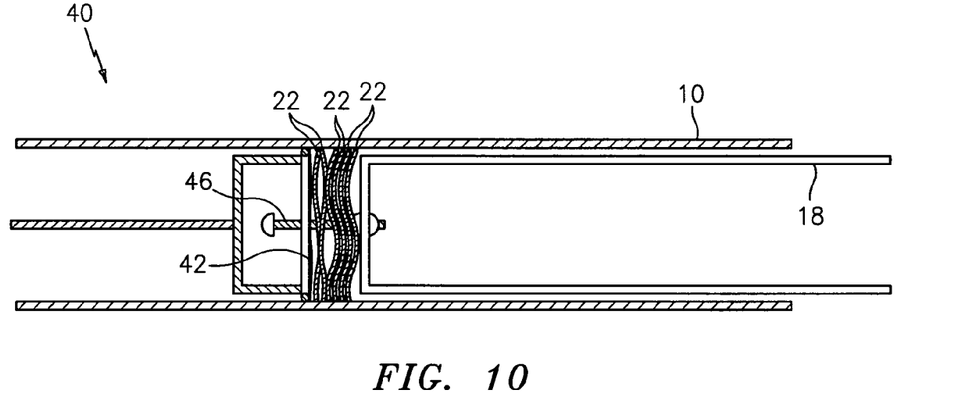
FIG. 10 is a top sectional view of the self locking apparatus of FIG. 9, with the wave springs in a compressed state.

FIG. 9 shows a top sectional view of another embodiment 40 of the disclosed apparatus where the load initiating element 14 enables compression of an initiator wave spring 42. Additional wave springs 22 may be added to increase the friction area and axial load bearing capability of the embodiment 40 of the self locking apparatus. Also, by adding some additional hardware such as a pin 46 that is fixedly coupled to the inner tube 18 and is slideably coupled to a piston 50 such that when a force pulls the piston to the left, and the piston is restrained by the pin 46, then the pin 46 and piston 50 are not sliding with respect to each other, but when the piston 50 is pushed to the right, the pin 46 may slide into the piston 50. By pushing or pulling the piston to the right or to the left, one can position the load initiating element 14, pin 46, wave springs 22, 42 and the inner tube 18 in the housing. Additionally, if one moves the inner tube 18 to the right, the load initiating element 14, pin 46, and wave springs 22, 42 may also be re-positioned within the housing 10. However, if the inner tube 18 is moved to the left, the initiator wave spring 42 expands in compression and creates a frictional force between the initiator wave spring 42 and the inner surface of the housing 10 as shown in FIG. 10. As the axial force of the inner tube increases, the other wave springs 22 expand in compression, which locks the inner tube 18, wave springs 22 and 42 and load initiating element 14 in place relative to the housing 10, thus putting the apparatuses in a self locking mode.

Figure 11:
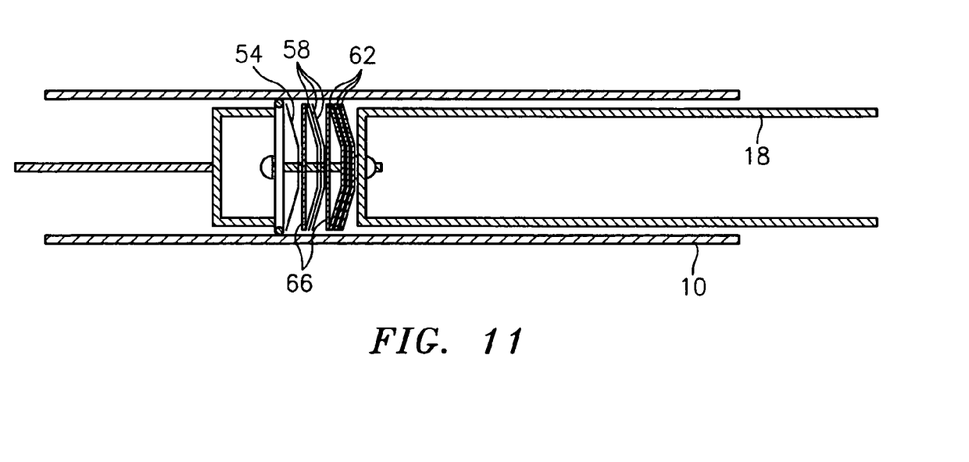
FIG. 11 is a top sectional view of one embodiment of the self locking apparatus with an initiator conic spring and intermediate load conic springs and primary load conic springs.
Figure 12:
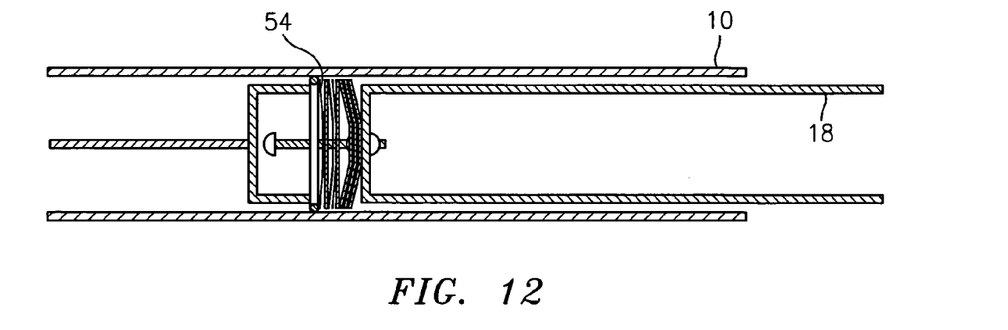
FIG. 12 is a top sectional view of the self locking apparatus of FIG. 11, with the conic springs in a compressed state.

FIGS. 11 and 12 show a similar embodiment to the one shown in FIGS. 9 and 10, but with conic springs used instead of wave springs. An initiator conic spring 54, intermediate load conic springs 58 and primary load conic springs 62 are used with separators 66 separating the types of springs. The separators 66 may be washers, very stiff wave springs, or any other device that will separate the initiator conic spring 54, intermediate conic spring 58 and primary conic springs 62. The primary load springs 62, as a group, are stiffer than the intermediate load springs 58, which in turn are stiffer than the initiator conic spring 54. Thus as the inner tube 18 is moved to the left, the initiator conic spring 54 expands in compression and creates a frictional force between the wave spring 54 and the inner surface of the housing 10. As the axial force of the inner tube increases, the intermediate wave springs 58 expand in compression. As the axial force of the inner tube continues to increase, the primary wave springs 62 expand in compression. As the wave springs 54, 58, 62 compress and expand, they lock the inner tube 18, wave springs 54, 58, 62 and load initiating element 14 in place relative to the housing 10.

Figure 13:
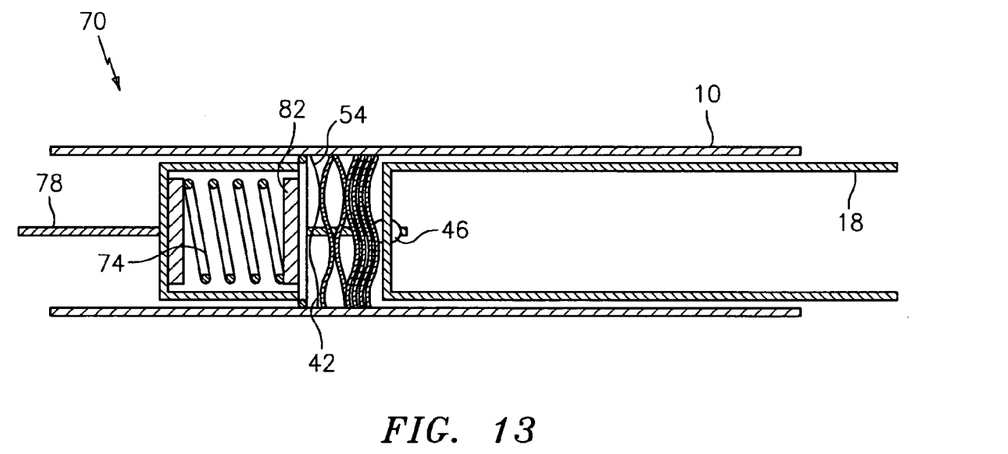
FIG. 13 is a top sectional view of one embodiment of a self locking apparatus with wave springs and a load transfer spring.

In FIG. 13, another embodiment 70 of the disclosed apparatus is shown. In this embodiment, a load transfer spring 74 allows forces used to position the springs 42, 54, pin 46 and inner tube 18 within the housing 10 to bypass the initiator wave spring 42. This embodiment therefore avoids the situation where the initiator wave spring 42 is prematurely compressed from a force from a piston rod 78 used to move and position the springs 42, 54, pin 46 and inner tube 18 within the housing 10. Thus, if the piston rod 78 is used to position the springs 42, 54, pin 46 and inner tube 18 within the housing 10 by moving the embodiment to the right, the moving force will travel from the piston rod 78, through the load transfer spring 74 through a piston head 82, through the pin 46 to the inner tube 18, thereby bypassing the wave springs 42, 22.

Figure 14:
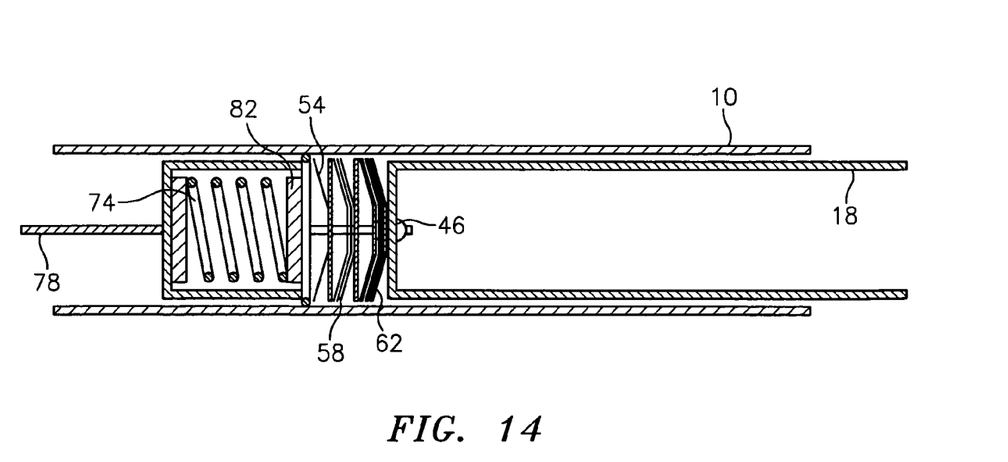
FIG. 14 is a top sectional view of one embodiment of the self locking apparatus with conic springs and a load transfer spring.

FIG. 14 shows a similar arrangement to that shown in FIG. 13, but with conic springs 54, 58 and 62 instead of wave springs.

Figure 15:
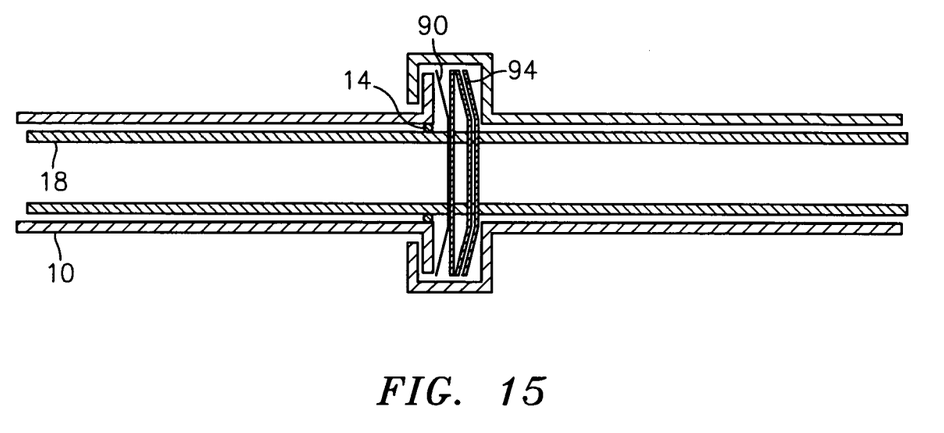
FIG. 15 is a top sectional view of one embodiment of the self locking apparatus with inwardly biased conic springs.

FIG. 15 shows another embodiment 86 of the self locking apparatus, but this embodiment 86 uses conic springs that have been biased for inward expansion, like the conic spring 34 shown in FIG. 6. With this type of spring, one can create a resisting force between the internal circumference of the springs 90, 94 and the outside circumference of an inner tube 18 passing through the center of the springs 90, 94. Similar to the other embodiments, a load initiating element 14 provides the resistance necessary to compress the initiator internally biased conic spring 90 that, in turn, supplies sufficient resistance to compress the next stage of internally biased springs 94. In FIG. 15, only two stages of springs 94 are shown, but a person skilled in the art would recognize that one may incorporate as many spring stages as are necessary to handle a specified design load.

Figure 16:
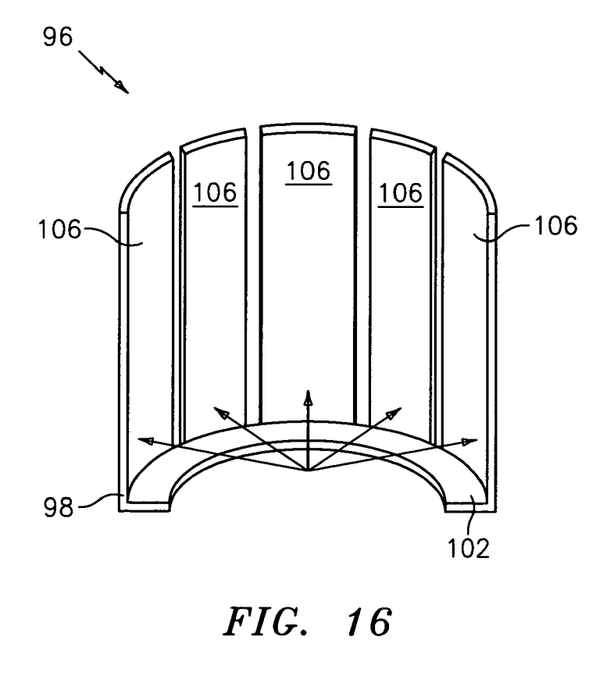
FIG. 16 is a perspective sectional view of one embodiment of a load transfer element for use in self locking apparatuses.

All shown and previously discussed embodiments have used the interface friction directly between spring elements and a housing 10. Referring now to FIG. 16, a load transfer element 96 embodiment is shown which would be used as an intermediate element between the spring and the housing surface. This would enable the independent optimization of the spring characteristics and the interface friction characteristics. One possible form of this intermediate element would be a cylindrical body 98 with a bottom annulus 102 against which the spring elements (not shown) would be positioned, and multiple vertical cuts in the cylindrical side wall to form load transfer segments 106 which can transfer the force from the expansion of the spring elements to an outer tube (not shown) that encloses the cylinder 98. The friction force between the outer surfaces of the load transfer segments 106 and the inner surface of an outer tube would lock the embodiment 96 in place with respect the outer tube. This embodiment may be configured such that the cylindrical body locks by inwardly applying a radial force on an inner tube which the cylindrical body fits around. This would be accomplished by having an inwardly biased conic spring adjacent to a annular surface that is on the outside of the cylindrical body.

Figure 17:
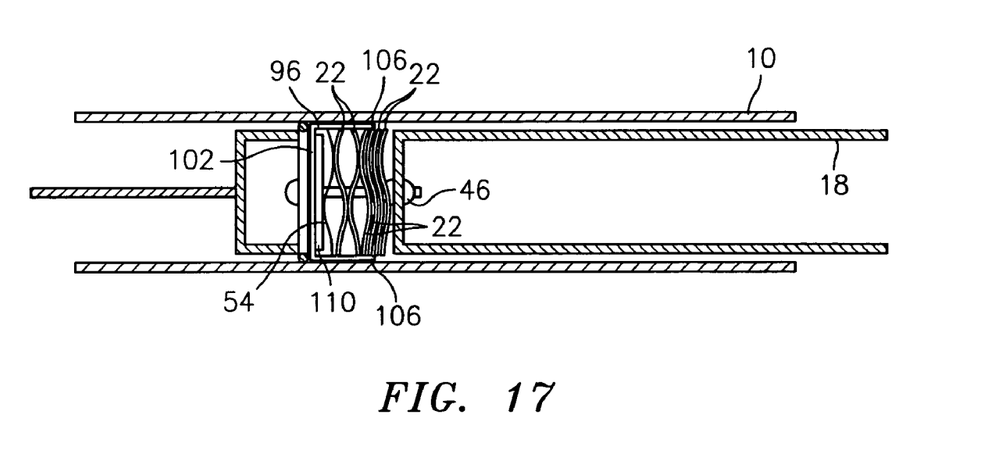
FIG. 17 is a top sectional view of an embodiment of the load transfer embodiment in a self locking apparatus.

FIG. 17 shows a self locking apparatus using an embodiment of the load transfer element 96. A spacer washer 110 is located between the initiator conic spring 54 and the load transfer element 96, and the load transfer element is located between the washer 110 and the piston 50. The load transfer element 96 allows for the efficient load transfer from the wave springs 22, 54 to the outer tube. The spacer washer 110 is used to locate the initiator wave spring 54 in a radially compliant region of the load transfer element 96. In another embodiment, the load transfer element bottom annulus 102 may have a single radial cut to enable more radial load transfer near the bottom annulus 102.

Figure 18:
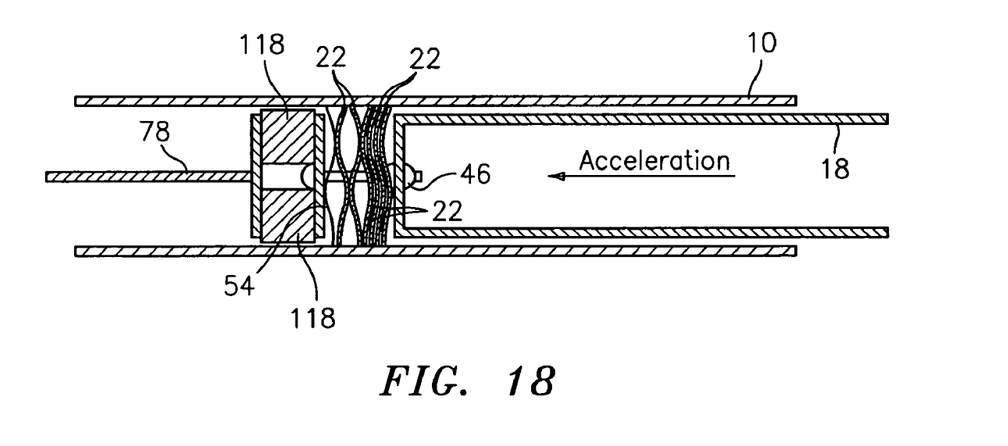
FIG. 18 is a top sectional view of an inertial loading embodiment of a self locking apparatus.

FIG. 18 shows an inertial loading embodiment 114 of a self locking apparatus. At least one mass element 118, slideably attached to the pin 46, provides sufficient inertial load such that the initiator wave spring 54 compresses and locks when the inner tube 18 exceeds design acceleration threshold in the direction of the arrow. Numerous other means of creating the resistance necessary to initiate compression of a spring stack, such as a direct mechanical connection or a viscous design to enable a velocity dependent actuation, are possible and will generally depend on the specific application.

The embodiments of the self locking apparatus disclosed in this document provide a simple and low cost means for self locking an apparatus within a housing. In addition, some embodiments also provide a simple and low cost means for positioning such an apparatus in a housing.

It will be appreciated that the use of first and second or other similar nomenclature for denoting similar items is not intended to specify or imply any particular order unless otherwise stated.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. A self locking apparatus comprising:
   a housing;
   a load initiating element located within the housing so as to provide an axial frictional force between the load initiating element and the housing;
   a spring located adjacent to the load initiating element, and configured to expand in compression against the housing in response to a compressive load; and
   a compression member slideably disposed within the housing and configured to compress the spring from a side opposite the load initiating element, the spring being disposed between the compression member and the load initiating element;
   the load initiating element, spring, and compression member being slideable within the housing in a first axial direction and in a second opposite axial direction in response to an axial load on the load initiating element in each of the first and second directions, respectively, and lockable within the housing in the second axial direction in response to an axial load on the compression member in the second axial direction;
   the load initiating element being disposed to resist a force exerted by the compression member acting on the spring in a compressive manner in the second direction.

2. The self locking apparatus of claim 1, wherein the housing is an outer tube.

3. The self locking apparatus of claim 2, wherein the compression member comprises an inner tube slideably positioned within the outer tube.

4. The self locking apparatus of claim 3 further comprising:
   a pin rigidly attached to the inner tube and slideably attached to the spring; and
   a piston slideably attached to the pin, wherein the piston and the pin slide relative to each other in the first direction, and wherein the piston is restrained by the pin in the second direction;
   wherein the load initiating element via the axial frictional force is resistive to movement, thereby defining a resistance to movement, relative to a longitudinal axis of the housing; and
   wherein the piston, load initiating element, and pin are configured to slide the spring and inner tube within the outer tube in the first and second axial directions in response to an axial load on the piston sufficient to overcome the resistance to movement without loading the spring into a self locking mode.

5. The self locking apparatus of claim 1, wherein the spring is a wave spring.

6. The self locking apparatus of claim 1, wherein the spring is a conic spring.

7. The self locking apparatus of claim 6, wherein the conic spring is outwardly biased.

8. The self locking apparatus of claim 1, wherein the spring comprises:
   an initiator spring; and
   a plurality of additional springs.

9. The self locking apparatus of claim 8, wherein the plurality of additional springs comprise:

at least one intermediate load conic spring; and at least one primary load conic spring.

10. The self locking apparatus of claim 3, wherein the inner tube is in operable communication with a motor vehicle bumper, and the outer tube is in operable communication with a motor vehicle body.

11. The self locking apparatus of claim 1, wherein:

the spring is disposed to receive a compressive load from the compression member, and to transfer at least a portion of the compressive load to the load initiating element.

12. The self locking apparatus of claim 1, wherein:

the load initiating element, via the axial frictional force, is resistive to movement, thereby defining a resistance to movement, relative to a longitudinal axis of the housing;

the load initiating element, spring, and compression member are slideable within the housing in the first axial direction and in the second opposite axial direction in response to the axial load on the load initiating element sufficient to overcome the resistance to movement;

the load initiating element, spring, and compression member are slideable within the housing in the first axial direction in response to the axial load on the compression member in the first axial direction sufficient to overcome the resistance to movement; and the load initiating element, spring, and compression member are lockable within the housing in the second axial direction in response to the axial load on the compression member in the second axial direction sufficient to compress the spring against the housing, prior to the axial load overcoming the resistance to movement, with a locking force greater than the axial load, thereby defining a self locking mode.

13. A self locking apparatus comprising:

a housing;

a load initiating element located within the housing so as to provide an axial frictional force between the load initiating element and the housing, thereby providing a resistance to movement relative to a longitudinal axis of the housing;

a compression member slideably disposed within the housing relative to the longitudinal axis;

a spring disposed between the load initiating element and the compression member, and configured to expand in compression against the housing in response to a compressive load;

the load initiating element, spring, and compression member being axially slideable within the housing in response to an axial load on the load initiating element sufficient to overcome the resistance to movement;

the load initiating element, spring, and compression member being slideable within the housing in a first axial direction and lockable within the housing in a second axial direction in response to an axial load on the compression member in the first and second axial directions, respectively;

the load initiating element being disposed to resist a force exerted by the compression member acting on the spring in a compressive manner in the second direction.

14. The self locking apparatus of claim 13, wherein the compression member is in operable communication with a motor vehicle bumper, and the housing is in operable communication with a motor vehicle body.

15. A self locking apparatus comprising:

a housing;

a load initiating element located within the housing so as to provide an axial frictional force between the load initiating element and the housing;

a spring located adjacent to the load initiating element, and configured to expand in compression against the housing in response to a compressive load; and a compression member slideably disposed within the housing and configured to compress the spring from a side opposite the load initiating element;

the load initiating element, spring, and compression member being axially slideable in a first and a second axial direction within the housing in response to an axial load on the load initiating element sufficient to overcome the axial frictional force; the load initiating element, spring, and compression member being lockable within the housing in the second axial direction in response to an axial load on the compression member in the second axial direction;

the load initiating element being disposed to resist a force exerted by the compression member acting on the spring in a compressive manner in the second direction.

16. The self locking apparatus of claim 15, further comprising:

a pin rigidly attached to the compression member and slideably attached to the spring; and a piston slideably attached to the pin, wherein the piston and the pin slide relative to each other in the first direction, and wherein the piston is restrained by the pin in the second direction;

wherein the load initiating element via the axial frictional force is resistive to movement, thereby declining a resistance to movement, relative to a longitudinal axis of the housing; and wherein the piston, load initiating element, and pin are configured to slide the spring and compression member within the housing in the first and second axial directions in response to an axial load on the piston sufficient to overcome the resistance to movement without loading the spring into a self locking mode.

* * * * *